United States Patent [19]

Shimokawa et al.

[11] 4,179,895
[45] Dec. 25, 1979

[54] COOLING SYSTEM USING LOW POTENTIAL AND HIGH POTENTIAL ENERGIES

[75] Inventors: Kenji Shimokawa, Cyofu; Muneshige Nagatomo; Yasuo Tanaka, both of Tokyo, all of Japan

[73] Assignees: Agency of Industrial Science and Technology; Ministry of International Trade and Industries, both of Tokyo, Japan

[21] Appl. No.: 875,007

[22] Filed: Feb. 3, 1978

[51] Int. Cl.² ............... F25B 27/00; F25B 15/00; F25B 33/00
[52] U.S. Cl. .............................. 62/2; 62/476; 62/497
[58] Field of Search ..................... 62/2, 476, 497

[56] References Cited

U.S. PATENT DOCUMENTS

| 3,530,684 | 9/1970 | Porter | 62/497 |
| 3,651,655 | 3/1972 | Dyre | 62/476 |
| 3,837,174 | 9/1974 | Migagi et al. | 62/476 |
| 3,928,983 | 12/1975 | Ainbinder et al. | 62/476 |
| 4,085,595 | 4/1978 | Saito et al. | 62/497 |
| 4,085,596 | 4/1978 | Miyamoto et al. | 62/476 |

FOREIGN PATENT DOCUMENTS 45-6382  3/1970  Japan .

Primary Examiner—Lloyd L. King
Attorney, Agent, or Firm—Stevens, Davis, Miller & Mosher

[57] ABSTRACT

A cooling system which includes an occluding section for occluding vaporized cooling agent by means of an occluding agent so as to ensure continuous evaporation of cooling agent in the evaporating section. The system includes a high pressure and low pressure recovery sections for recovering the cooling agent from the occlusive agent by applying heat thereto. When a low potential energy is available, the occlusive agent is passed from the occluding section only to the low pressure recovery section, but when a high potential energy is to be used, it is passed through the high and low pressure recovery sections in this order.

11 Claims, 2 Drawing Figures

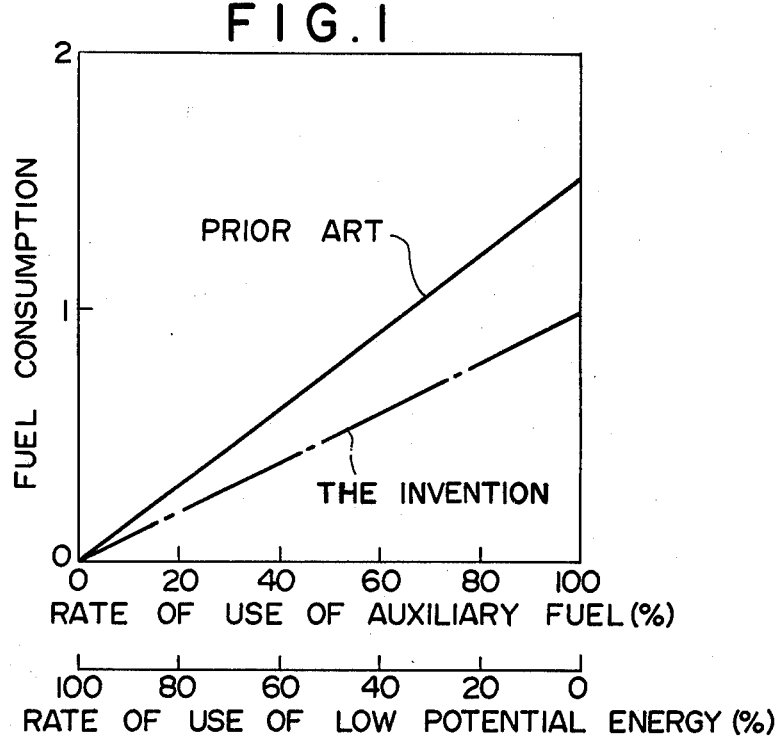
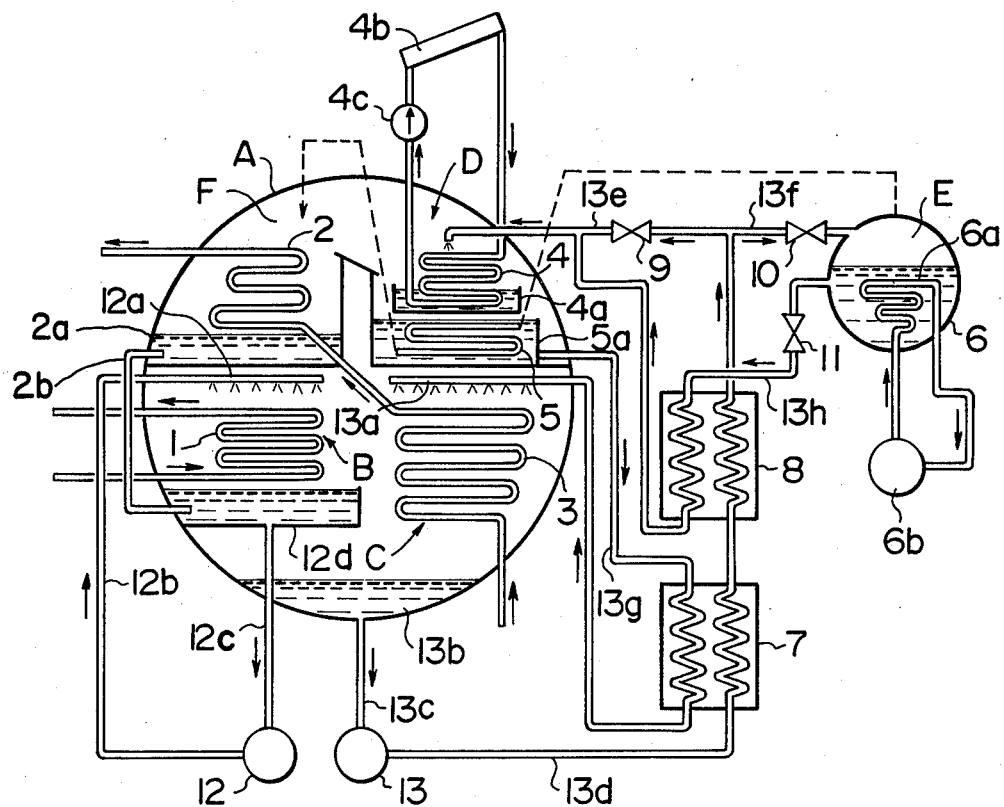

COOLING SYSTEM USING LOW POTENTIAL AND HIGH POTENTIAL ENERGIES

The present invention relates to cooling systems utilizing occlusive agents and more specifically to such cooling systems including high and low potential energy sources.

It has been known to provide a cooling system in which low temperature water is prepared by utilizing a thermal energy of a relatively low potential, for example, of approximately 70° to 100° C. such as in case of heat of the sun or waste heat where plenty of such energy is available. A cooling system utilizing an occlusive agent may be operated under such circumstances with a coefficient of performance of approximately 0.65. Where such low potential energy is available only intermittently as in the case of heat the sun, however, it is required to use an auxiliary heat source which is adapted to utilize a fossilized fuel, such as coal or petroleum. In this instance, the co-efficient of performance will also be approximately 0.65 as far as the same cooling system is used.

In the usual occlusive agent type cooling system, the co-efficient can be increased to as large as 1.0 by increasing the potential of the heat energy because a double effect system is established. It should therefore be noted that, under a circumstance wherein such auxiliary heat energy is utilized to a great extent, there will be no advantage in utilizing a low potential energy in combination. In fact, it has been found that, when the auxiliary heat energy is used to such an extent that more than 65% of total operation is served by the auxiliary heat energy in a single effect system, the amount of energy consumption will become greater than that in a double effect system.

It is therefore an object of the present invention to provide a cooling system which can be operated either as a single effect type or a double effect type.

Another object of the present invention is to provide a cooling system in which energy consumption can be significantly decreased.

A further object of the present invention is to provide an occlusive agent type cooling system which is primarily operated by a low potential energy and when such low potential energy is not available by a high potential energy as a double effect type.

According to the present invention, the above and other objects can be accomplished by a cooling system comprising a coolant circuit having a portion disposed in an evaporating section for feeding a coolant through the section, a cooling agent circuit for feeding a cooling agent through said evaporating section so that the cooling agent is evaporated in said evaporating section whereby the coolant is cooled due to evaporation of the cooling agent. The system includes an occluding section adapted to receive the evaporated cooling agent from said evaporating section, an occlusive agent circuit for feeding an occlusive agent through the occluding section so that the evaporated cooling agent is occluded by the occlusive agent, means for collecting the occlusive agent which has occluded the cooling agent, a first recovery section provided with means for supplying low potential energy to said first recovery section, a second recovery section provided with means for supplying high potential energy to said second recovery section, means for feeding the occlusive agent which has occluded the cooling agent alternately to said first and second recovery sections so that the cooling agent in the occlusive agent is separated from the occlusive agent under the heat energy supplied to the sections. The system also has means for transferring the cooling agent separated from the occluding agent in said second recovery section through the first recovery section to the cooling agent circuit, means for transferring the occlusive agent in said second recovery agent so that the occlusive agent is brought into a heat exchanging relationship with the cooling agent from the second recovery section for further separating the cooling agent still occluded in said occluding agent, means for transferring the cooling agent separated from the occluding agent in said first recovery section to said cooling agent circuit. The aforementioned means for alternately feeding the occlusive agent which has occluded the cooling agent to the first and second recovery sections may include selector valve means for alternately directing the occlusive agent to either one of the first and second recovery sections.

The occlusive agent to be fed to the first or second recovery section may preferably be brought into heat exchange relationship with the occlusive agent being returned from the recovery sections to the occlusive agent circuit. The occlusive agent to be fed to the first or second recovery section may be brought into heat exchange relationship with the occlusive agent being transferred from the second recovery section to the first recovery section. These arrangements are effective to improve thermal efficiency of the system. Further, the cooling system may be provided in the occluding section with a cooling circuit in which a cooling medium such as water is passed to cool the occlusive agent so that the occlusive capacity of the agent is further increased.

The above and other objects and the features of the present invention will become apparent from the following descriptions of a preferred embodiment taking reference to the accompanying drawings, in which:

FIG. 1 is a diagram showing the relationship between the fuel consumption and the rate of use of auxiliary fuel; and, FIG. 2 is a schematic circuit diagram of the cooling system in accordance with one embodiment of the present invention.

Referring now to FIG. 1, there is shown a relationship between the fuel consumption and the rate of use of auxiliary fuel in a single effect type cooling system and in the cooling system in accordance with the present invention. In the ordinate, there is shown the amount of fuel consumption in terms of a ratio to the fuel consumption in a double effect type cooling system. The abscissa shows the rate of use of auxiliary fuel or the rate of use of low potential heat energy. As shown by solid line in FIG. 1, when the auxiliary fuel is used in more than 65% of total operation, the fuel consumption in a single effect type cooling system becomes greater than that in a double effect type system using only high potential energy. When the system is operated as a double effect type only when the low potential energy is not available, however, the fuel consumption can be significantly decreased as shown by dotted line in FIG. 1. The present invention therefore provides a cooling system which can be used as either of single and double effect types.

Referring now to FIG. 2, the cooling system shown therein includes an enclosure A which has an evaporating section B and an occluding section C both defined therein. In the evaporating section B, there is disposed a coolant conduit 1 for feeding a coolant such as water in the direction shown by arrows in FIG. 2. Above the coolant conduit 1, there is disposed a cooling agent spray tube 12a which is connected through a cooling agent conduit 12b with a feed pump 12. The feed pump 12 is in turn connected through a conduit 12c with a cooling agent pan 12d which is located beneath the coolant conduit 1.

The feed pump 12 draws cooling agent such as water from the pan 12d and feeds the agent to the spray tube 12a so that the cooling agent is sprayed on the coolant conduit 1. The evaporating section B is maintained at a relatively low pressure so that the cooling agent sprayed from the spray tube 12b is evaporated to provide a low temperature in the section B. The cooling agent in liquid form is collected in the pan 12d.

The occluding section C is provided adjacent to the evaporating section B so that occluding section C is also filled with the vapor of the cooling agent. In the upper part of the occluding section C, there is disposed an occlusive agent spray tube 13a and the lower part of the enclosure A constitutes a pan 13b for the occluding agent. A feed pump 13 is connected through a conduit 13c with the pan 13b to draw occluding liquid therefrom. The feed pump 13 has an outlet connected with a conduit 13d which passes through a first and second heat exchangers 7 and 8 and is connected on one hand with a conduit 13e having a valve 9 and on the other hand with a conduit 13f having a valve 10.

In the upper portion of the enclosure A, there is defined a low pressure recovery section D having a upper pan 4a and a lower pan 5a which are disposed one above the other. The conduit 13e is opened through a spray nozzle to the low pressure recovery section D at a position above the upper pan 4a. The lower pan 5a is connected through a conduit 13g with the spray tube 13a. The conduit 13g is passed through the heat exchanger 7 so that the liquid in the conduit 13g is brought into heat exchanging relationship with the liquid in the conduit 13d.

The cooling system includes a high pressure recovery section E defined in a second enclosure 6 and the conduit 13f is opened to the section E. The high pressure recovery section E is connected through a conduit 13h to the conduit 13e downstream of the valve 9. The conduit 13h has a shut-off valve 11 and is passed through the heat exchanger 8 so that the liquid in the conduit 13h is brought into heat exchange relationship with the liquid in the conduit 13d.

The occlusive agent such as lithium bromide is thus circulated by the pump 13 from the pan 13b through the conduit 13d and when the valve 9 is opened through the conduit 13e to the pan 4a. The agent in the upper pan 4a overflows to the lower pan 5a and passes through the conduit 13g to the spray tube 13a to be sprayed therefrom. When the valve 10 is opened, the occlusive agent is passed to the high pressure recovery section E and from the section E it is further passed through the conduits 13h and 13e to the low pressure recovery section D.

The agent sprayed from the tube 13a functions to occlude the vapor of the cooling agent in the occluding section C which is contiguous with the evaporating section B. Therefore, the atmosphere in the evaporating section B can be maintained substantially below the saturating value in respect of the content of the vapor of the cooling agent. Since the occlusive capacity of the agent increases as the temperature decreases, a cooling circuit 3 is provided in the occluding section C. In the circuit 3, a coolant such as water is passed. The occluding agent which has been diluted by the vapor of the cooling agent is accummulated in the pan 13b and circulated as described above.

In the upper pan 4a of the low pressure recovery section D, there is provided a low potential heat tube 4 which is connected with a low potential energy source 4b such as a sun heat collector. Water is circulated by means of a pump 4c through the tube 4 and the source 4b. The occlusive agent sprayed from the conduit 13e in the low pressure recovery section D is heated by the medium in the tube 4 so that the cooling agent is separated in the form of a vapor from the occluding agent. The occluding agent separated from the cooling agent is accummulated in the pan 4a and overflows to the lower pan 5a as previously described.

The high pressure recovery section E is provided with a high potential heat tube 6a which is connected with a high potential energy source 6b. The occlusive agent in the section E is thus heated by the high potential medium in the tube 6a and the cooling agent is separated in the form of a vapor from the occlusive agent. The vapor of the cooling agent is then passed through a conduit 5 which has a portion dipped in the occlusive agent in the lower pan 5a. The occlusive agent in the high pressure recovery section E is transmitted through the conduit 13h and 13e to the upper pan 4a and then to the lower pan 5a. In the conduit 13h, the occlusive agent is passed through the heat exchanger 8 where it gives heat to the agent in the conduit 13d. The occlusive agent from the high pressure recovery section E is again heated by the fluid in the tube 5 at the pan 5a in the low pressure recovery section D. Thus, the cooling agent still remaining in the occlusive agent is vaporized and the occlusive agent is further condensed.

In the enclosure A, there is further provided a condensing section F which is located adjacent to the low pressure recovery section D. The section F is contiguous at its upper portion with the low pressure recovery section D in that it receives the vapor of the cooling agent separated in this section D from the occluding agent. A coolant tube 2 is provided in the condensing section F and connected with the tube 3 in the occluding section C so that the tube 2 receives a supply of coolant from the tube 3. The cooling agent is thus condensed at the section F by being cooled by the coolant in the tube 2. The tube 5 is opened to the condensing section F to discharge the vapor of the cooling agent which is also condensed in this section F. The cooling agent thus condensed is then accummulated in a pan 2a which is connected through a conduit 2b with the pan 12d.

It should be noted that the in the aforementioned arrangement, the valves 9 and 10 constitute a selector valve assembly which direct the liquid in the conduit 13d alternately to the conduits 13e and 13f by alternately opening the valves 9 and 10, respectively. When low potential energy is available, the valve 9 is opened and the valve 10 is closed, with the pump 4c being operated. Thus, the occluding agent is circulated only through the low pressure recovery section D. The system is therefore operated as a single utility system.

When low potential energy is not available, the valve 10 is opened and the valve 9 is closed. The system is then brought into operation by operating a high potential energy source 6b, for example, a boiler. Thus, the occluding agent is therefore circulated through the high pressure recovery section E and the low pressure recovery section D. Therefore, the system is operated as a double utility type wherein the recovery of the cooling agent is performed in two stages. The system can therefore be operated with a satisfactorily high efficiency irrespective of whether or not a low potential energy is available.

The invention has thus been shown and described with reference to a specific embodiment, however, it should be noted that the invention is in no way limited to the details of the illustrated arrangement but changes and modifications may be made without departing from the scope of the appended claims. For example, the coolant tube 1 may be provided at its outlet part with a temperature responsive device for automatically controlling the operations of the valves 9 and 10, of the pump 4c and of the boiler 6b.

We claim:

1. Cooling system comprising a coolant circuit having a portion disposed in an evaporating section for feeding a coolant through the section, a cooling agent circuit for feeding a cooling agent through said evaporating section so that the cooling agent is evaporated in said evaporating section whereby the coolant is cooled due to evaporation of the cooling agent, an occluding section adapted to receive the evaporated cooling agent from said evaporating section, an occlusive agent circuit for feeding an occlusive agent through the occluding section so that the evaporated cooling agent is occluded by the occlusive agent, means for collecting the occlusive agent which has occluded the cooling agent, a first recovery section provided with means for supplying low potential energy to said first recovery section, a second recovery section provided with means for supplying high potential energy to said second recovery section, means for feeding the occlusive agent which has occluded the cooling agent alternately to said first and second recovery sections so that the cooling agent in the occlusive agent is separated from the occlusive agent under the heat energy supplied to the sections, means for transferring the cooling agent separated from the occluding agent in said second recovery section through the first recovery section to the cooling agent circuit, means for transferring the occlusive agent in said second recovery section so that the occlusive agent is brought into a heat exchanging relationship with the cooling agent from the second recovery section for further separating the cooling agent still occluded in said occluding agent, means for transferring the cooling agent separated from the occluding agent in said first recovery section to said cooling agent circuit.

2. Cooling system in accordance with claim 1 which further includes a condensing section for receiving the cooling agent from the first and second recovery section and condensing it before it is transferred to the cooling agent circuit.

3. Cooling system in accordance with claim 1 in which said means for alternately feeding the occlusive agent which has occluded the cooling agent to the first and second recovery sections includes selector valve means for alternately directing the occlusive agent to either one of the first and second recovery sections.

4. Cooling system in accordance with claim 1 which further includes heat exchanging means for bringing the occlusive agent being fed to the recovery sections into heat exchanging relationship with the occlusive agent being returned from the recovery sections to the occlusive agent circuit.

5. Cooling system in accordance with claim 1 which further includes heat exchanging means for bringing the occlusive agent being fed to the recovery sections into heat exchange relationship with the occlusive agent being transferred from the second recovery section to the first recovery section.

6. Cooling system in accordance with claim 1 which further includes cooling means provided in the occluding section for cooling the occlusive agent so that occlusive capacity of the agent is further increased.

7. Cooling system in accordance with claim 2 in which said condensing section includes cooling means for cooling the cooling agent from the recovery sections.

8. The system of claim 1 in which the means for supplying low potential energy is a relatively unstable energy source.

9. The system of claim 1 in which the means for supplying low potential energy is a sun heat collector and a heat tube connected thereto.

10. The system of claim 9 in which the heat tube is a closed circuit tube.

11. The system of claim 1 in which the means for supplying high potential energy is a separate source such as a boiler.

* * * * *